US 9,007,568 B2

(12) United States Patent
Tang et al.

(10) Patent No.: US 9,007,568 B2
(45) Date of Patent: Apr. 14, 2015

(54) DISTANCE DETECTING INDUCTION DEVICE

(75) Inventors: Qiaomei Tang, Shanghai (CN); Guofeng Chen, Shanghai (CN)

(73) Assignee: Shanghai Kohler Electronics, Ltd. (CN)

( * ) Notice: Subject to any disclaimer, the term of this patent is extended or adjusted under 35 U.S.C. 154(b) by 1082 days.

(21) Appl. No.: 13/061,102

(22) PCT Filed: Aug. 27, 2009
(Under 37 CFR 1.47)

(86) PCT No.: PCT/CN2009/073568
§ 371 (c)(1),
(2), (4) Date: Jun. 24, 2013

(87) PCT Pub. No.: WO2010/022663
PCT Pub. Date: Mar. 4, 2010

(65) Prior Publication Data
US 2013/0265562 A1  Oct. 10, 2013

(30) Foreign Application Priority Data

Aug. 28, 2008  (CN) .......................... 2008 1 0042138

(51) Int. Cl.
*G01C 3/08* (2006.01)
*G01S 7/481* (2006.01)
(Continued)

(52) U.S. Cl.
CPC ................. *G01C 3/08* (2013.01); *G01S 7/4813* (2013.01); *G01S 17/026* (2013.01); *G01S 17/48* (2013.01)

(58) Field of Classification Search
CPC ........ G01C 3/08; G01C 15/002; G01S 17/89; G01S 7/4817; G01S 17/42

USPC ......... 356/3.01, 4.01, 4.07, 5.01, 5.09, 9, 625
See application file for complete search history.

(56) References Cited

U.S. PATENT DOCUMENTS 3,932,211 A * 1/1976 Loving, Jr. ..................... 376/255
5,093,879 A * 3/1992 Bregman et al. ................ 385/93
(Continued)

FOREIGN PATENT DOCUMENTS

| CN | 1083195 A | 3/1994 |
| CN | 1573286 A | 2/2005 |

(Continued)

OTHER PUBLICATIONS

International Search Report and Written Opinion with English translation for International Applicaiton No. PCT/CN2009/073568, mail date Dec. 3, 2009, 25 pages.

*Primary Examiner* — Luke Ratcliffe
*Assistant Examiner* — Samantha K Abraham
(74) *Attorney, Agent, or Firm* — Foley & Lardner LLP (57) ABSTRACT

A distance detecting induction device includes a casing, a circuit board within the casing, and a pair of focusing lenses provided at respective openings in the casing. The distance detecting induction device further includes an emitting device including an infrared light emitting diode for emitting infrared light rays to the emitting lens and a receiving device including a distance detection induction module for inducing reflected light rays focused by the receiving lens. The distance detecting induction device further includes an emitting light ray guiding device arranged between the emitting lens and the emitting device. The guiding device includes a small circular hole provided at a position of the emitting device and a big circular hole provided at a position of the emitting lens.

20 Claims, 7 Drawing Sheets

(51) Int. Cl.
*G01S 17/02* (2006.01)
*G01S 17/48* (2006.01)

(56) References Cited

U.S. PATENT DOCUMENTS

| | | | |
|---|---|---|---|
| 5,760,390 A | 6/1998 | Vezzalini et al. | |
| 6,921,893 B1* | 7/2005 | Petschik et al. | 250/221 |
| 2002/0092967 A1* | 7/2002 | Matsumoto | 250/208.1 |
| 2004/0001193 A1* | 1/2004 | Takaoka | 356/3.03 |
| 2005/0062004 A1* | 3/2005 | Parsons et al. | 251/129.04 |
| 2005/0133754 A1* | 6/2005 | Parsons et al. | 251/129.17 |
| 2006/0198045 A1* | 9/2006 | Lim et al. | 360/97.01 |
| 2007/0121696 A1* | 5/2007 | Ishii | 372/99 |
| 2008/0218973 A1* | 9/2008 | Xie et al. | 361/704 |
| 2008/0247038 A1* | 10/2008 | Sasaki et al. | 359/395 |

FOREIGN PATENT DOCUMENTS

| | | |
|---|---|---|
| CN | 1607375 A | 4/2005 |
| CN | 101042298 A | 9/2007 |
| CN | 101216562 A | 7/2008 |
| CN | 101387513 B | 6/2010 |
| CN | 101387514 B | 7/2010 |
| CN | 101220883 B | 9/2010 |
| JP | 06-168652 A | 6/1994 |

* cited by examiner

DISTANCE DETECTING INDUCTION DEVICE

CROSS-REFERENCE TO RELATED PATENT APPLICATIONS

This application is a U.S. National Phase Application claiming the benefit of and priority to International Application No. PCT/CN2009/073568, filed Aug. 27, 2009, which claims the benefit of and priority to Chinese Patent Application No. 200810042138.2, filed Aug. 28, 2008. The entire disclosures of International Application No. PCT/CN2009/073568 and Chinese Patent Application No. 200810042138.2 are incorporated herein by reference.

TECHNICAL FIELD

The present invention relates to an infrared induction device, in particular, it is a Position Sensitive Detector (PDS) being used in the area of hygiene and bathroom automation, including automatic induction faucet, automatic flushing urinal and so on.

BACKGROUND ART

Infrared sensor has been widely applied in many hygienic products such as automatic faucet, automatic flushing urinal, toilet flushing device, toilet seat with hot water jet, hand dryer, flush toilet with hot air fan, etc.

Most traditional infrared sensor use an active mode of infrared induction, namely infrared emitting device emitting infrared light of a certain wavelength, which will be reflected by human body, and then received by infrared receiving device, with determining the strength of the reflected signal, to realize automatic induction determination. However, for some substances of low reflectance to infrared light (such as black colored clothes, hair, etc), it is hard to achieve the automatic induction determination. After being reflected by these substances, only a small portion of the infrared light emitted by infrared emitting device will be received by infrared receiving device. Due to the insufficient strength of the reflected signal, it will lead to that the sensor can not determine whether there is a target, which may result in induction failure.

Figure 9:
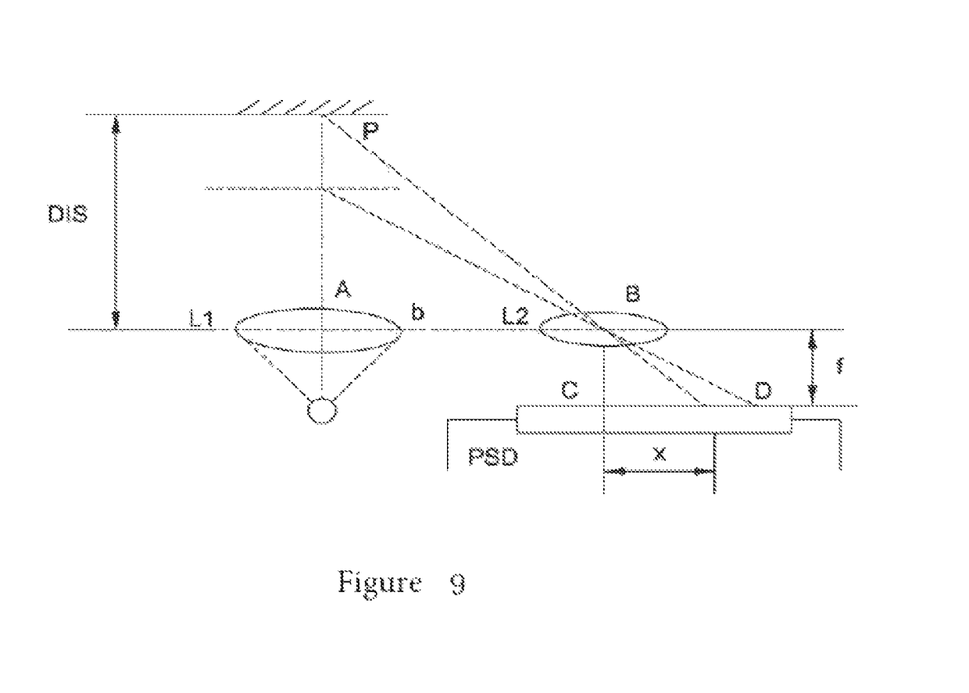
FIG. 9 is a working diagram of the distance detecting induction device in the prior art.

In order to solve the above induction failure problem that is associated with the traditional infrared induction hygienic products, the Position Sensitive Detector (PDS) has been introduced into the area of hygiene and bathroom automation. As shown in FIG. 9, PSD is an optoelectronic device sensitive to incident light position. That is to say, when the incident light shines one different positions of a device's photosensitive surface, the PSD will output different electrical signals accordingly. The PSD achieves the automatic induction determination based on the principle of triangulation with the characteristic of an accurate distance measurement. As shown in the FIG. 9, after being focused by the Lens L1, light from a light source will be projected to the surface of the object to be detected. The reflected light is next focused by the Lens L2 to a one-dimensional PSD, and forms a light spot. If the center distance between the lenses L1 and L2 is b, the distance between the Lens L2 and the PSD surface (i.e., the focal length of the Lens L2) is f, the distance between the light spot focused on PSD surface and the center of the Lens L2 is x, then based on the nature of the similar triangles PAB and BCD, it can be drawn that the detected distance DIS is: DIS=bf/x. Hence, as long as the value of the light spot position's coordinate x has been determined, the distance of the target can be obtained.

When the detected distance of the target is within the pre-determined range, the distance detecting induction device will control the hygienic product to conduct such working states as watering, flushing and so on. Since the distance detecting induction device achieves the purpose of automatic induction by detecting the distance between target and the distance detecting induction device, rather than by determining the strength of the emitted signal, it thus can effectively solve the defect problem of "an insufficient strength of the reflected signal leads to an induction failure" that is associated with the traditional infrared induction.

However, with using such distance detecting induction device, it can be easily affected by the halo of the emitted infrared light, and hence results in certain problems of detection accuracy.

SUMMARY OF INVENTION

The purpose of the present invention is to provide a distance detecting induction device with fairly high detection accuracy.

The purpose of the present invention is achieved by the following technical solution: a distance detecting induction device, comprising a casing, focusing lenses, a circuit board provided with a plurality of electronic components, an emitting device for emitting infrared light rays, and a receiving device for receiving and inducing reflected infrared light rays. Wherein the casing comprises a main body part and two circular openings provided on the top surface of the main body part. The lenses comprise an emitting lens and a receiving lens provided at the positions of the two circular openings. The circuit board is arranged inside the main body part, provided with a number of electronic components to treat signals; the emitting device is an infrared light emitting diode installed on the circuit board for emitting the infrared light rays to the emitting lens. The receiving device is a distance detection induction module installed on the circuit board for inducing the reflected light rays focused by the receiving lens. The distance detecting induction device further comprises an emitting light guiding device arranged between the emitting lens and the emitting device; the guiding device comprises a big circular hole provided at the position of the emitting lens and a small circular hole provided at the position of a transmitting tube core of the emitting device, wherein the small circular hole and the big circular hole form a tapered infrared light emitting channel.

Further, the small circular hole is smaller than the light emitting surface of the transmitting tube core.

Further, the emitting light guiding device also comprises a holding part to hold the emitting devices. The holding part is connected through the small circular hole.

Further, the distance detecting induction device also comprises an indicator to indicate the working state or abnormal conditions. The indicator is mounted on the circuit board and located close to the emitting device.

Further, the emitting light guiding device is provided with a corresponding displaying hole.

Further, the distance detecting induction device also comprises a sealing part installed between the receiving lens and the receiving device.

Further, the distance detecting induction device also comprises a cable organizing device fixed on the casing by screws.

Further, the distance detecting induction device also comprises a shield arranged around the emitting device and the receiving device, to prevent electromagnetic interference.

Further, the shield can be divided as first and second shields that have been soldered together, wherein the first shield is fixed to the casing by screws and contacted to the circuit board so as to be grounded; the second shield is fixed to the casing through a fastening structure. The emitting device and the receiving device are arranged in between the shield and the circuit board.

Further, the lenses and casing are mounted together by way of injection molding. Furthermore, the casing is made of a conductive material. In comparison to the prior art, the distance detecting induction device of the present invention has high detection accuracy, and improves the induction of the whole device.

DESCRIPTION OF EMBODIMENTS

The embodiments of the present invention are described below in details with reference to the accompanying drawings. In the figures, the same structure or function is marked with the same numerals. It should be noted that the accompanying drawings are only intended to assist to describe the specific embodiments of the present invention. It is not an excessive description or for the purpose of limiting the scope of the present invention. Moreover, the drawings are not necessarily drawn to scale.

In reference to FIGS. 1-7, the distance detecting induction device 100 of the present invention, is mainly installed in various types of automatic hygienic and bathroom products, such as induction urinal, induction toilet and induction faucet, etc.

The distance detecting induction device 100 of the present invention mainly comprises: casing 1, focusing lenses 2, circuit board 3 provided with a plurality of electronic components, emitting device 4 for emitting infrared light rays, receiving device 5 for receiving and inducing reflected infrared light and a shield 6 with the electromagnetic shielding function.

Wherein, the emitting device 4 and receiving device 5 are arranged at the same side of the circuit board 3. In one of the embodiments of the present invention, the emitting device 4 and receiving device 5 have been soldered to the circuit board 3 by solder pins. The lenses 2 are fixed to the casing 1, which comprise emitting lens 21 for focusing and emitting the emitting infrared light and receiving lens 22 for focusing and emitting the reflected light to the receiving device 5.

Due to the fact that the distance detecting induction device 100 needs to have certain accuracy for the relative positions of the emitting device 4 and receiving device 5, and the relative positions of the emitting device 4 and receiving device 5, lenses 2, the distance detecting induction device 100 of the present invention also comprises an emitting positioning bracket 7 for fixing the emitting device 4, and the receiving positioning bracket 8 for fixing the receiving device 5. The emitting and receiving positioning brackets 7, 8 hold the emitting device 4 and receiving device 5 respectively, and through the coordinated positioning with the casing 1, to ensure position accuracy of the emitting device 4 and receiving device 5.

Moreover, the shield 6 is arranged at the outside of the side of circuit board that has been installed with the emitting device 4 and receiving device 5, in order to prevent the electromagnetic interference (EMI) of the environment to the emitting device 4 and the receiving device 5.

Wherein, the casing 1 comprises an elongated main body part 10 and first and second circular openings 11, 12 provided on top surface of the main body part 10. The lenses 2, the circuit board 3 provided with a plurality of electronic components, the emitting device 4, receiving device 5 and shield 6 are all arranged inside of the main body part 10 of the casing 1. Accordingly, the emitting lens 21 and receiving lens 22 of the lenses 2 are arranged in the first and second circular openings 11, 12, respectively. The casing 1 is made of insulating materials (such as ordinary plastic etc.). It is also true that in another preferred embodiment of the present invention, casing 1 can be made of conductive materials (such as metal or conductive plastic, etc), in order to achieve the desired anti-electromagnetic-interference effect.

In the preferred embodiments of the present invention, the emitting lens 21 and receiving lens 22 of lenses 2 have been installed in the first and second circular openings 11, 12 of casing 1 by way of injection molding. Specifically, the lenses 2 and casing 1 are installed through two-injection molding, i.e., the lenses 2 are injection-molded firstly, and then the formed lenses 2 are placed in the mold of casing 1 and to be injection-molded with the casing 1 together. Through the approach of injection molding, it not only solves the sealing issue between the lenses 2 and the casing 1, but also ensures the accuracy of the center of lenses 2 and its corresponding position on the casing 1. Wherein, the lower parts of emitting and receiving lens 21, 22 are made as two cylinders, in order to ensure their accurate relative positioning with the casing 1 during the process of injection molding. In particular, the emitting lens 21 and receiving lens 22 are connected through a connecting part 23. In the prior art, the emitting lens 21 and receiving lens 22 are installed separately. But as there are certain positioning accuracy requirements between emitting lens 21 and receiving lens 22, between lenses 2 and emitting device 4, receiving device 5, it is not easy to accurately control the positioning for the separately installation and thus will be very hard to meet the accuracy requirements. Therefore, as being installed as a whole, the present invention is able to ensure the positioning accuracy through connecting the emitting lens 21 and receiving lens 22 via a connecting part 23. Furthermore, the connecting part 23 also comprises at least one bending portion to prevent the emitting light being conducted from the emitting lens 21 to the receiving lens 22 directly through the connecting part 23, which may result into certain unnecessary internal light reflection and refraction, and thus to affect detection accuracy of the PSD. In the embodiments shown in FIGS. 2 and 3, the connecting part is in a z shape with multiple bending portions. With a comprehensive consideration of the cost and effect, in such a design, there are two reflections, through which light travels from the emitting lens 21 to the receiving lens 22. The light pass is more complex, thereby can more effectively prevent the emitting light traveling from the emitting lens 21 to the receiving lens 22. It is also true that the bending portion can be increased or decreased according to the specific application. In another embodiment of the present invention, the lenses 2 and the casing 1 can also be installed by way of mounting assembly.

Wherein, the circuit board 3 is integrated with a number of electronic components, and a first through hole 31 and second through hole have been installed to face the emitting lens 21 and receiving lens 22. The first through hole 31 allows the emitting positioning bracket to be connected through. The circuit board processes the signal, and transfers the processed data to a main control device, thus to further control the hygienic and bathroom devices (not shown).

Figure 1A:
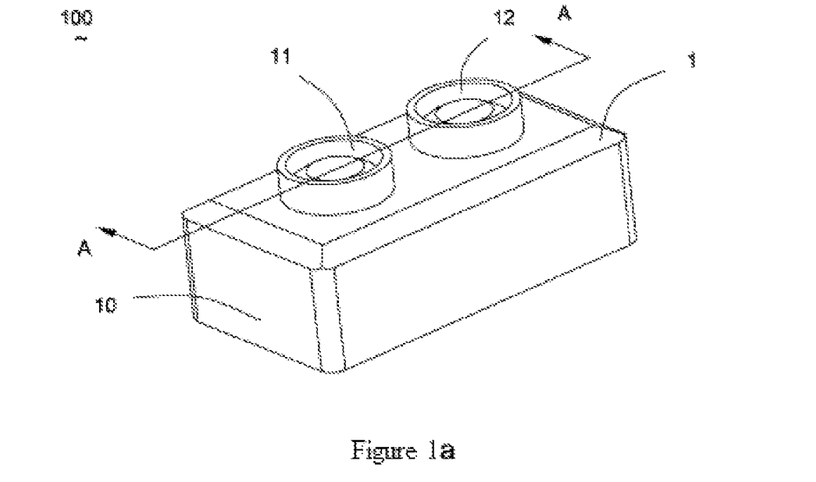
FIG. 1a is a perspective view of the distance detecting induction device of the present invention.
Figure 1B:
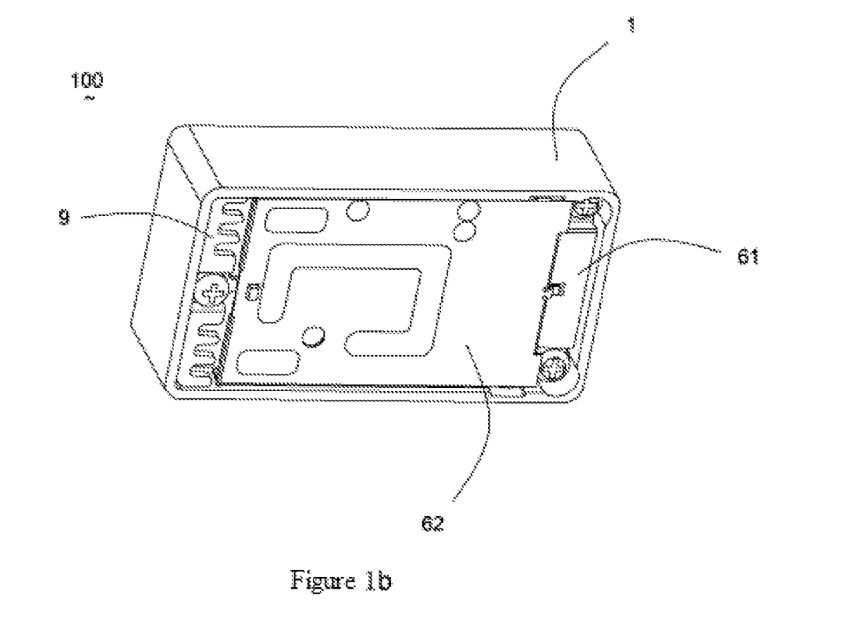
FIG. 1b is another perspective view (from another angle) of the distance detecting induction device of the present invention.
Figure 2:
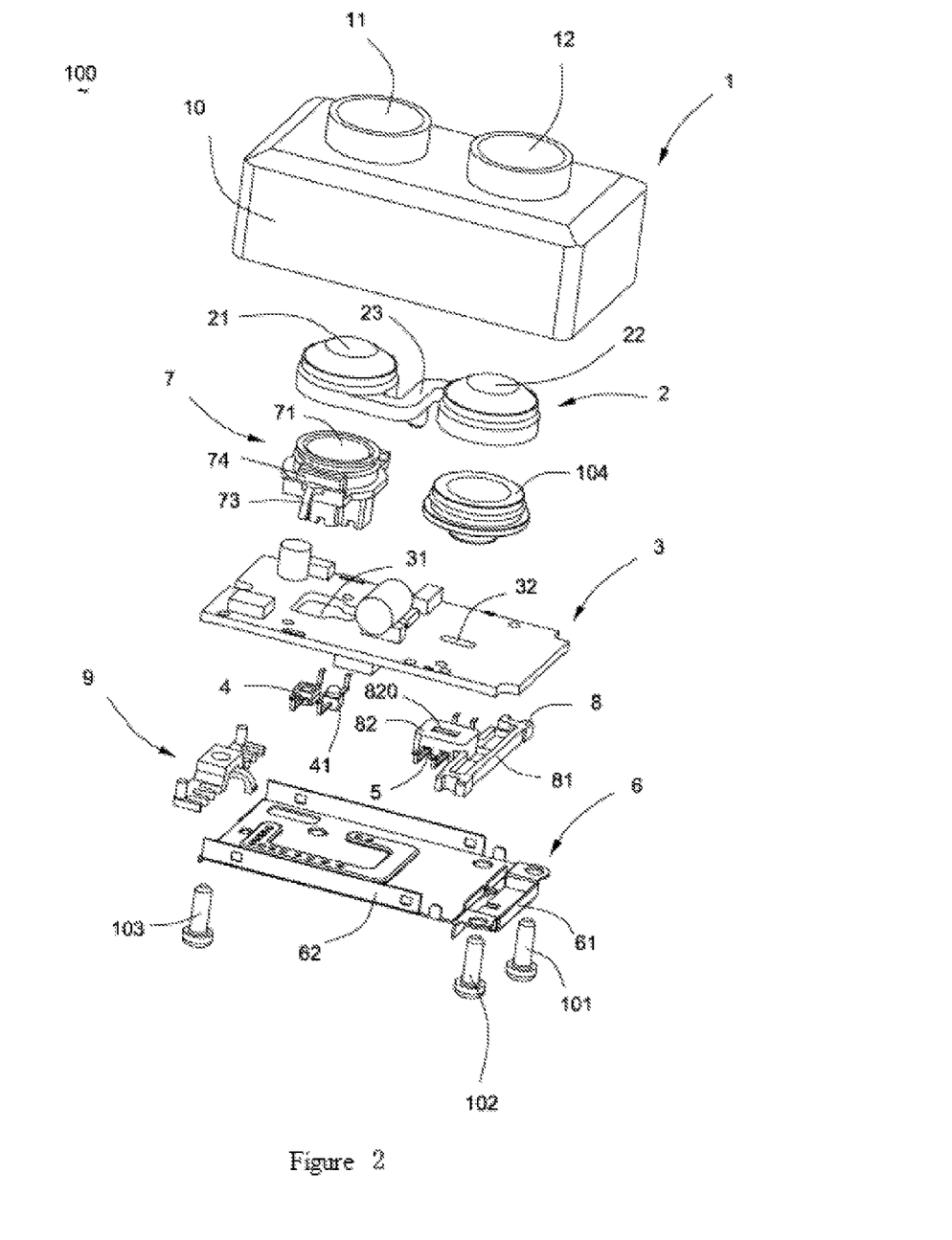
FIG. 2 is an exploded schematic view of the distance detecting induction device of the present invention.
Figure 3:
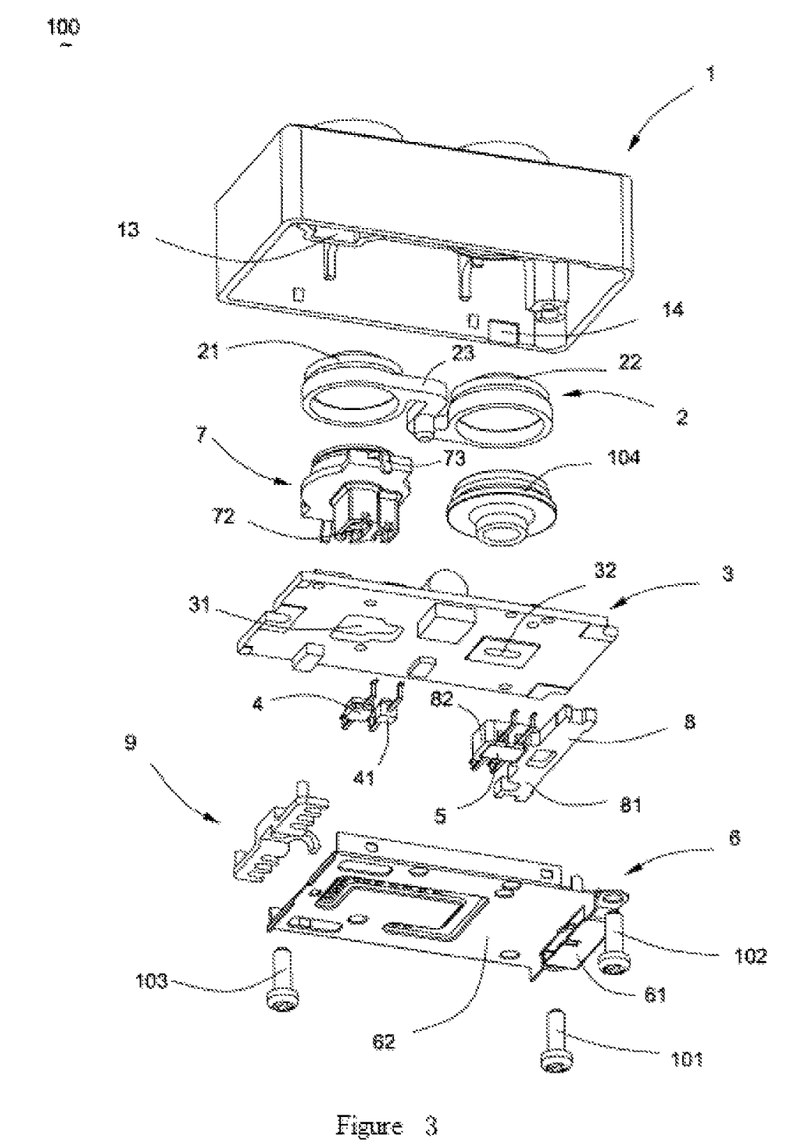
FIG. 3 is another exploded schematic view (from another angle) of the distance detecting induction device of the present invention.
Figure 4A:
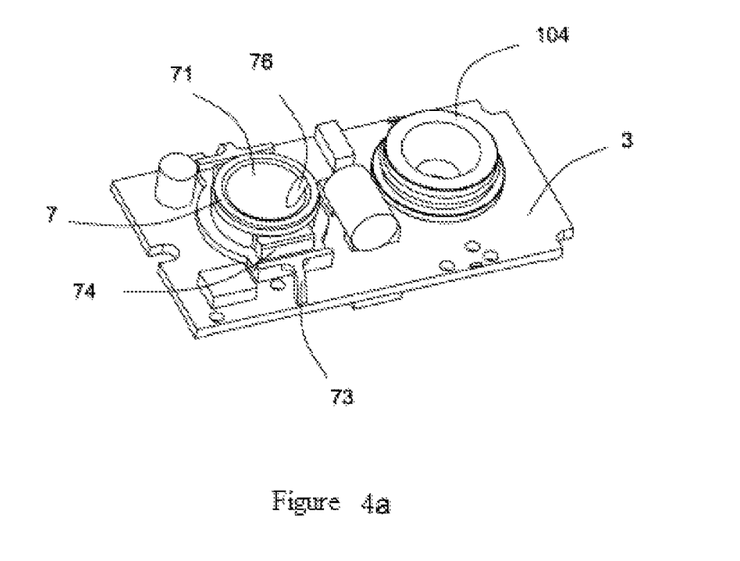
FIG. 4a is a perspective assembly view of the device portion of the distance detecting induction device of the present invention.
Figure 4B:
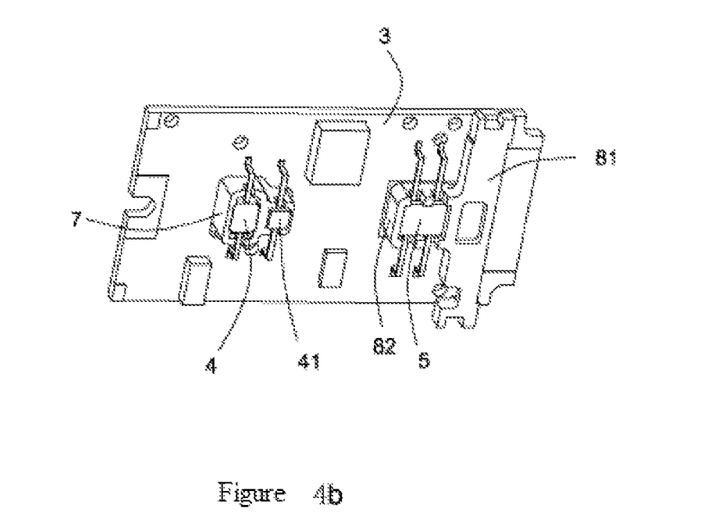
FIG. 4b is the structure of FIG. 4a from another point of view.
Figure 4C:
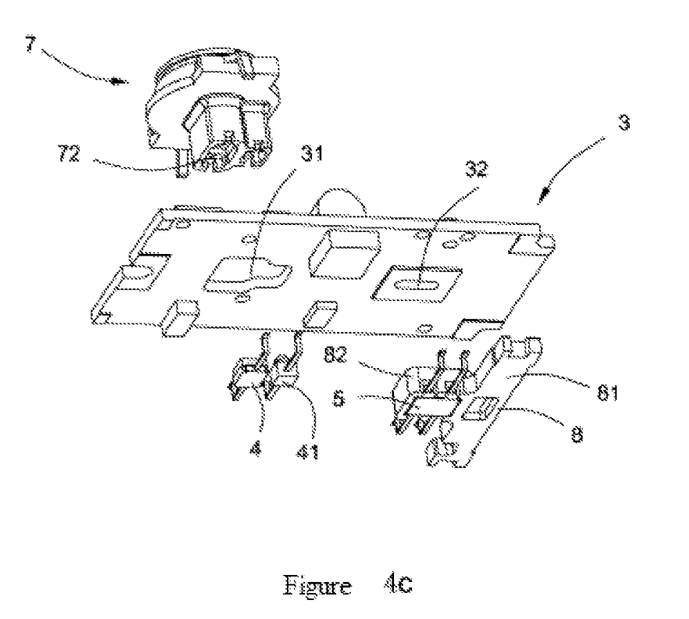
FIG. 4c is an exploded schematic view of the structure illustrated in FIG. 4b.
Figure 5:
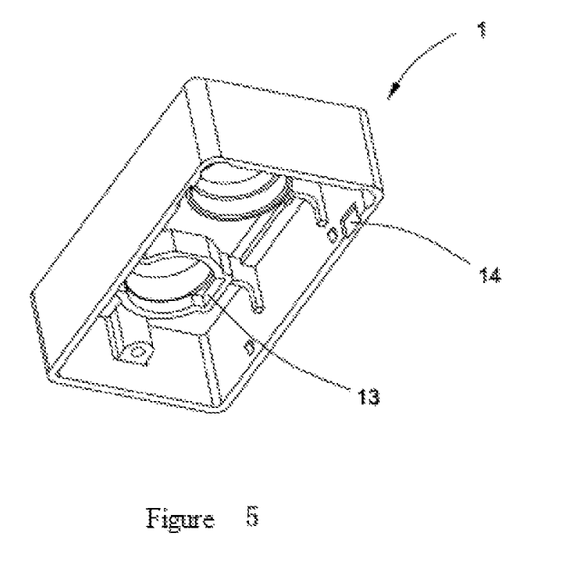
FIG. 5 is a view of the casing of the distance detecting induction device of the present invention.

Wherein, the emitting device 4 is infrared light emitting diode (IR LED) installed on the circuit board 3, and located on the bottom side of the circuit board 3 (as shown in FIGS. 2 and 3, the side of the circuit board 3 that faces lenses 2 is the top side, and the opposite side is the bottom side of circuit board 3). An indicator 41 with indicating function has been installed on the same side with the emitting device 4, as a window to show the working state of the distance detecting induction device 100, or such abnormal conditions such as low battery power.

Wherein, the receiving device 5 is a distance detection induction module (PSD Sensing Module) installed on the circuit board 3 and located on the bottom side of the circuit board 3.

Wherein, the shield is installed on the bottom of casing 1 by screws 101 and 102, to shield the emitting device 4 and receiving device 5. The shield 6 comprises first shield 61 and second shield 62. Wherein the first shield 61 is firstly fixed to the casing 1, and then contacted the ground line of circuit 3 by the screws 101 and 102 to ground. The second shield is fixed to the casing 1 through the form of a fastening structure and soldered to the first shield 61 so as to be grounded. Through such arrangement, it can prevent the occurrence of singly installing a whole piece of shield, which may compromise the installation and fixation.

Wherein, the emitting positioning bracket 7 is installed on casing 1, including a big circular opening 71 arranged at top of the bracket to coordinate with the emitting lens 21, and a holding part 72 arranged at the bottom of the bracket to hold the emitting device 4. The diameter of the big circular opening 71 is largely equal to that of the emitting surface of the emitting lens 21. There are supporting columns 73 installed at the extension of both sides of the emitting positioning bracket 7, to make the emitting positioning bracket 7 to contact with the circuit board 3. This arrangement allows the circuit board 3 to provide enough supporting force for the emitting positioning bracket 7, in order to prevent certain problems such as the occurrence of the emitting positioning bracket 7 falling off from the casing 1 during the installation. In particular, the emitting positioning bracket 7 also comprises a square boss 74 arranged at both sides of the emitting positioning bracket 7. The square boss 74 acts in concert with the positioning slot 13 located at the internal top surface of the casing 1, in order to position the emitting positioning bracket 7 with the casing 1. It is also true that the square boss 74 can be made in other shapes or installed at other locations of the emitting positioning bracket 7, such as a cylindrical boss. The holding part 72 of emitting positioning bracket 7 goes through the first through hole 31 of the circuit board from the above, to hold and position the emitting device 4 at the bottom side of 3. The solder pins extend from the banding part and are soldered to the circuit board 3, through the gaps (not labeled) at two sides of the holding part 72. The emitting positioning bracket 7 is made of insulating materials; and of course, it can also be made of conductive materials. When it is made of conductive materials, it can be used as a shield body to prevent electromagnetic interference.

Figure 6:
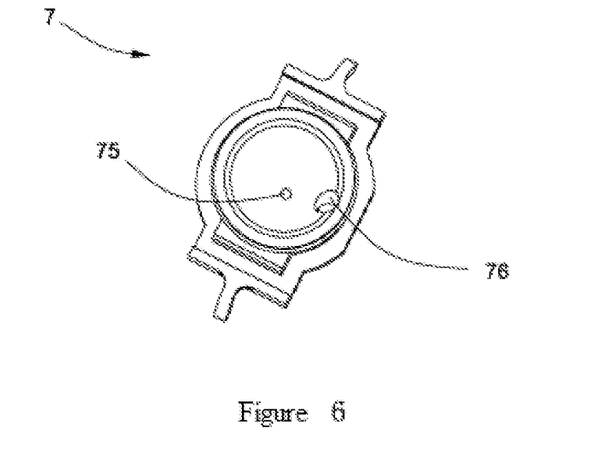
FIG. 6 is a view of the emission positioning bracket of the distance detecting induction device of the present invention.
Figure 8:
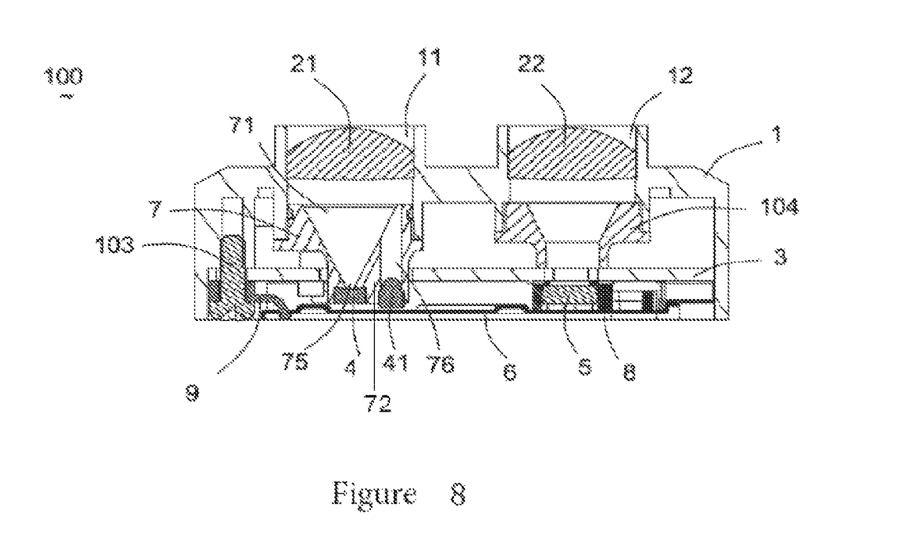
FIG. 8 is a cross-sectional view of Figure 1a along the A-A line.

As shown in FIG. 6, the emitting positioning bracket 7 also includes a small circular opening 75 closed to emitting device 4's holding part 72, and a display hole 76 for the indicator 41. As shown in FIG. 8, the emitting small circular opening 75 and big circular opening 71 form a tapered infrared emitting channel. Such set up will make the emitting light from the transmitting tube core of emitting device 4 to be emitted through the small circular opening 75, goes through the big circular opening 71, and then to be emitted again after being focused by the emitting lens 21. Hence it can ensure the emitting light will not be emitted to other areas of casing 1, which may affect the efficiency and generate light interference. Also, without the internal light being reflected or refracted to the receiving device 5, it will not affect the detection efficiency. At the same time, due to the fact that the transmitting tube core is relatively big, this may leads to the phenomenon that the emitted light has a quite large halo, which is a very significant disadvantage to the receiving device that requires accurate signals, and thus will affect the detected induction results. In the present embodiments, the infrared light from the emitting device transmitting tube core held in the holding part 72 is only emitted through the small circular opening 75 to the outside. The small circular opening is smaller than the emitting surface of the emitting device. So those unnecessary parts have been blocked. With this kind of arrangement, it can also effectively reduce the influence of the halo to the detected signal, thus to improve the detection accuracy. In this context, the emitting positioning bracket 7 may act as an emitting light guiding device.

Figure 7A:
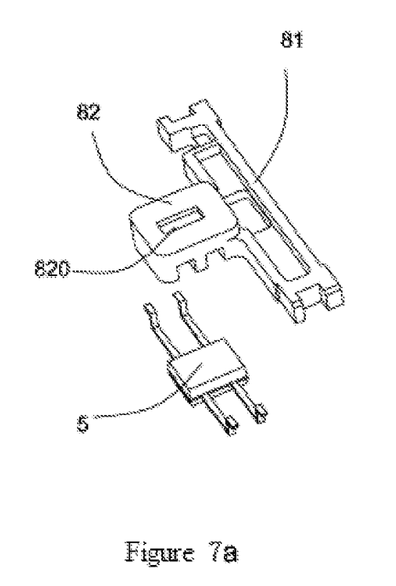
FIG. 7a is an exploded view of the receiving device and its positioning bracket of the distance detecting induction device of the present invention.
Figure 7B:
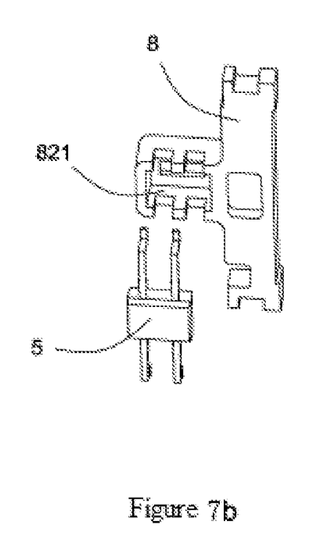
FIG. 7b is the structure of FIG. 7a from another point of view.

In combination with what's been shown in FIG. 7a and FIG. 7b, the receiving positioning bracket 8 comprises a beam 81 that is mounted to the casing, and the holding part 82 that is connected to the beam 81 and for holding the receiving device 5. The holding part 82 comprises a holding space 821 to hold the receiving device 5. In addition, a rectangular opening 820 is arranged on the top surface of the holding part 82 and aligned to the second through hole 32 of the circuit board 32, in order to facilitate the receiving light to be received on the receiving surface of the receiving device 5. The holding part 82 is a horizontal extension of the middle part of the beam 81, with the purpose of facilitating the solder pins of the receiving device 5 to conveniently extend from the gaps located on both sides of the holding part 82 (not labeled) and to be soldered. At the same time, the two free ends of the beam 81 are clamped with the positioning slots 14 located on both side walls of the main body part 10 of the casing 1, in order to achieve the purpose of effective positioning.

The distance detecting induction device 100 of the present invention also comprises a cable organizing device 9. The device 9 is able to effectively organize the cables and cords (not shown) on the circuit board 3, and fix them inside the casing 1 via the screws 103.

The distance detecting induction device 100 of the present invention also comprises a sealing part 104, which is arranged in between the lenses 2 and the circuit board 3 and to provide the sealing effect. On the one hand, the sealing part 104 is able to prevent the epoxy from entering into the receiving device 5, such as entering the receiving device 5 through the second through hole 32; on the other hand, it can also prevent the interfering light from entering into the casing 1 or entering into the receiving device 5. In the present embodiment, the sealing part 104 is made of silicone rubber. And of course, it can be made of other sealing materials. It is also true that, if the condition allows, a similar sealing structure can also be arranged in between the emitting lens 21 and the emitting device 4.

In combination with what's shown in FIG. 8, because of the first and second through holes 31 and 32 being disposed on the circuit board 3, the emitting infrared light from the emitting device 4 is emitted to the emitting lens 21 through the first through hole 31. The emitting lens 21 focuses the emitting infrared light to the target area. When a person or a moving object enters the target area, the infrared light will be reflected. And the receiving lens 22 will receive the reflected infrared light and focus the reflected light, then emit the received reflected light to the receiving device 5 through the second through hole 32. In addition, the receiving device 5 will be able to calculate the target object's distance, which is based on the principle of triangulation of the PSD, and finally control the hygienic or bathroom devices. Through this kind of arrangement, it makes the emitting device 4 and the receiving device 5 to be disposed on the bottom side of the circuit board 3 (i.e., the side of the circuit board 3, which is facing the lenses 2, is the top side, and the opposite side of the circuit board 3 is the bottom side). Due to the fact that the lenses 2 of the distance detecting induction device 100 of the present invention need the fixed focal lengths, this kind of arrangement can take a full advantage of the thickness of the circuit board 3 to use such thickness as a portion of the focal length. At the same time, since other electronic components need to be arranged on the circuit board 3, the disposition of installing the emitting device 4 and the receiving device 5 among these electronic components is able to take a full usage of the space inside the casing 1 and of the top and bottom sides of the circuit board 3. In Summary, this kind of arrangement can reduce the height and volume of the entire distance detecting induction device 100.

In addition, after being installed, the emitting device 4 and the receiving device 5 are located in between the circuit board 3 (may also play a shielding effect) and the shield 6, and are capable of effectively shielding the external interference.

The emitting device 4 and the receiving device 5 of the distance detecting induction device 100 of the present invention are fixed via the positioning brackets 7 and 8, to ensure the accurate positioning of the emitting device 4 and the receiving device 5. Through their coordination and fixation with the casing 1, the positioning brackets 7 and 8 can ensure the relative positioning of the emitting device 4 and the receiving device 5 to the casing 1. With arranging the emitting device 4 and the receiving device 5 to the respective holding parts of the positioning bracket 7 and 8, and then soldering them for fixation, it makes certain that their positioning accuracy will not be affected by the process of installation. In this way, it will be able to effectively prevent that in the case when the emitting device 4 and the receiving device 5 are soldered to the circuit board 3, due to the issues associated with the installation process or other problems, the installation accuracy is not good enough. And this will result into the drawback that the effect of the distance detecting induction device 100 is not satisfactory, or even become failure.

On the other hand, the distance detecting induction device 100 of the present invention has a relatively low costs of production, and can be widely applied.

Although the preferred embodiments of the present invention have been disclosed above, they are not intended to limit the scope of the present invention. It is to be readily understood to one of ordinary skill in the art that many other possible modifications and variations can be made without departing from the spirit and scope of the present invention as hereinafter claimed.

What is claimed is:

1. A distance detecting induction device, comprising:
a casing comprising a main body part and two circular openings provided on a top surface of the main body part;
focusing lenses comprising an emitting lens and a receiving lens provided at positions of the two circular openings respectively;
a circuit board arranged inside the main body part and provided with a plurality of electronic components to treat signals;
an emitting device comprising an infrared light emitting diode installed on the circuit board for emitting infrared light rays to the emitting lens;
a receiving device comprising a distance detection induction module installed on the circuit board for inducing reflected light rays focused by the receiving lens;
an emitting light guiding device arranged between the emitting lens and the emitting device the guiding device comprising a big circular hole provided at a position of the emitting lens and a small circular hole provided at a position of the emitting device, wherein the small circular hole and the big circular hole form a tapered infrared light emitting channel, wherein the small circular hole is smaller than an emitting surface of the emitting device such that a portion of the infrared light rays emitted by the emitting device is blocked from entering the light emitting channel.

2. The distance detecting induction device of claim 1, the emitting light guiding device further comprising a holding part for holding the emitting device, the holding part extending through a hole in the circuit board and holding the emitting device on an opposite side of the circuit board relative to the emitting lens.

3. The distance detecting induction device of claim 1, further comprising an indicator for showing a working state or an abnormal condition, the indicator being arranged on the circuit board and being close to the emitting device.

4. The distance detecting induction device of claim 3, wherein the emitting light guiding device is set up with a corresponding displaying hole.

5. The distance detecting induction device of claim 1, further comprising a sealing part arranged between the receiving lens and the receiving device.

6. The distance detecting induction device of claim 1, further comprising a cable organizing device being fixed on the casing by screws.

7. The distance detecting induction device of claim 1, further comprising a shield arranged around the emitting device and the receiving device to prevent an electromagnetic interference.

8. The distance detecting induction device of claim 7, wherein the shield comprises a first shield and a second shield soldered together, wherein the first shield is fixed to the casing by screws and electrically grounded to the circuit board, wherein the second shield is fixed to the casing through a fastening structure, wherein the emitting device and the receiving device are arranged between the shield and the circuit board.

9. The distance detecting induction device of claim 1, wherein the lenses and the casing are installed together through a way of injection molding.

10. The distance detecting induction device of claim 1, wherein the casing is made of a conductive material.

11. A distance detecting induction device, comprising:
- a casing comprising a main body part and two circular openings provided on a top surface of the main body part;
- focusing lenses comprising an emitting lens and a receiving lens provided at positions of the two circular openings respectively;
- a circuit board arranged inside the main body part and provided with a plurality of electronic components to treat signals;
- an emitting device comprising an infrared light emitting diode installed on the circuit board for emitting infrared light rays to the emitting lens;
- a receiving device comprising a distance detection induction module installed on the circuit board for inducing reflected light rays focused by the receiving lens;
- an emitting light guiding device arranged between the emitting lens and the emitting device, the guiding device comprising a big circular hole provided at a position of the emitting lens and a small circular hole provided at a position of the emitting device, wherein the small circular hole and the big circular hole form a tapered infrared light emitting channel;
- a first shield fixed to the casing and electrically grounded to the circuit board, wherein the first shield is arranged around the emitting device to prevent electromagnetic interference and the first emitting device is arranged between the first shield and the circuit board; and
- a second shield fixed to the casing and electrically coupled to the first shield, wherein the second shield is arranged around the receiving device to prevent electromagnetic interference and the second emitting device is arranged between the second shield and the circuit board.

12. The distance detecting induction device of claim 11, wherein the small circular hole is smaller than an emitting surface of the emitting device.

13. The distance detecting induction device of claim 12, wherein a portion of the infrared light rays emitted by the emitting device is blocked from entering the light emitting channel.

14. The distance detecting induction device of claim 11, further comprising a holding part for holding the emitting device, the holding part extending through a hole in the circuit board and holding the emitting device on an opposite side of the circuit board relative to the emitting lens.

15. The distance detecting induction device of claim 11, further comprising an indicator for showing a working state or an abnormal condition, wherein the indicator is arranged on the circuit board close to the emitting device.

16. The distance detecting induction device of claim 15, wherein the emitting light guiding device is set up with a corresponding displaying hole.

17. The distance detecting induction device of claim 11, further comprising a sealing part arranged between the receiving lens and the receiving device.

18. The distance detecting induction device of claim 11, further comprising a cable organizing device fixed on the casing by screws.

19. The distance detecting induction device of claim 11, wherein the lenses and the casing are installed together through a way of injection molding.

20. The distance detecting induction device of claim 11, wherein the casing is made of a conductive material.

* * * * *